(12) United States Patent
Torrens et al.

(10) Patent No.: US 8,276,076 B2
(45) Date of Patent: *Sep. 25, 2012

(54) METHODS AND APPARATUS FOR VISUALIZING A MEDIA LIBRARY

(75) Inventors: Marc Torrens, Corvallis, OR (US);
Patrick Hertzog, Lausanne (CH);
Josep-Lluis Arcos, Bellaterra (ES)

(73) Assignee: Apple Inc., Cupertino, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/619,302

(22) Filed: Nov. 16, 2009

(65) Prior Publication Data
US 2010/0095212 A1   Apr. 15, 2010

Related U.S. Application Data

(63) Continuation of application No. 11/543,730, filed on Oct. 4, 2006, now Pat. No. 7,650,570.

(60) Provisional application No. 60/723,865, filed on Oct. 4, 2005.

(51) Int. Cl.
*G06F 3/16* (2006.01)

(52) U.S. Cl. .................. 715/727; 715/728; 715/730

(58) Field of Classification Search .............. 715/968, 715/727, 728, 730
See application file for complete search history.

(56) References Cited

U.S. PATENT DOCUMENTS

| | | |
|---|---|---|
| 5,583,763 A | 12/1996 | Atcheson |
| 5,918,014 A | 6/1999 | Robinson |
| 5,963,746 A | 10/1999 | Barker |
| 6,000,044 A | 12/1999 | Chrysos |
| 6,047,311 A | 4/2000 | Ueno |
| 6,134,532 A | 10/2000 | Lazarus |
| 6,275,229 B1 * | 8/2001 | Weiner et al. ............ 715/764 |
| 6,346,951 B1 | 2/2002 | Mastronardi |
| 6,381,575 B1 | 4/2002 | Martin |
| 6,434,621 B1 | 8/2002 | Pezzillo |

(Continued)

FOREIGN PATENT DOCUMENTS

EP    1 231 788    8/2002

(Continued)

OTHER PUBLICATIONS

International Search Report in matter PCT/US09/051233 dated Sep. 4, 2009; 3 pages.

(Continued)

*Primary Examiner* — Phenuel Salomon
(74) *Attorney, Agent, or Firm* — Novak Druce + Quigg LLP

(57) ABSTRACT

Visualizing and exploring a music library using metadata, such as genre, sub-genre, artist, and year, is provided. Geometric shapes, such as disks or rectangles, may be divided into sectors representing genre and each sector may be further divided into sub-sectors representing artists associated with each genre. The sector's relative size generally reflects the importance of the corresponding genre within the library. Likewise, the sub-sector's relative size generally reflects the importance of the corresponding artist within the genre which may be determined by the number of media items of the artist. Marks representing each media item may be arranged and displayed within the geometric shape to reflect the mark's corresponding genre, artist, and year. In addition, each mark may reflect an attribute, such as playcount, of the media item and each sector may reflect the mean value of an attribute of all media items within the sector.

14 Claims, 10 Drawing Sheets

U.S. PATENT DOCUMENTS

| | | | |
|---|---|---|---|
| 6,438,579 B1 | 8/2002 | Hosken | |
| 6,487,539 B1 | 11/2002 | Aggarwal | |
| 6,505,046 B1 | 1/2003 | Baker | |
| 6,526,411 B1 | 2/2003 | Ward | |
| 6,532,469 B1 | 3/2003 | Feldman | |
| 6,615,208 B1 | 9/2003 | Behrens | |
| 6,687,696 B2* | 2/2004 | Hofmann et al. | 1/1 |
| 6,748,395 B1* | 6/2004 | Picker et al. | 1/1 |
| 6,785,688 B2 | 8/2004 | Abajian | |
| 6,842,761 B2 | 1/2005 | Diamond | |
| 6,850,252 B1 | 2/2005 | Hoffberg | |
| 6,914,891 B2 | 7/2005 | Ha | |
| 6,931,454 B2 | 8/2005 | Deshpande | |
| 6,938,209 B2* | 8/2005 | Ogawa et al. | 715/727 |
| 6,947,922 B1 | 9/2005 | Glance | |
| 6,987,221 B2* | 1/2006 | Platt | 84/601 |
| 6,990,497 B2 | 1/2006 | O'Rourke | |
| 6,993,532 B1 | 1/2006 | Platt | |
| 7,020,637 B2 | 3/2006 | Bratton | |
| D518,566 S | 4/2006 | Bratton | |
| 7,072,846 B1 | 7/2006 | Robinson | |
| 7,082,407 B1 | 7/2006 | Bezos | |
| 7,096,234 B2 | 8/2006 | Plastina | |
| 7,111,240 B2 | 9/2006 | Crow et al. | |
| 7,120,619 B2 | 10/2006 | Drucker | |
| 7,180,473 B2 | 2/2007 | Horie | |
| 7,256,341 B2* | 8/2007 | Plastina et al. | 84/615 |
| 7,315,764 B1* | 1/2008 | Sutardja et al. | 700/94 |
| 7,457,862 B2 | 11/2008 | Hepworth | |
| 7,493,572 B2 | 2/2009 | Card | |
| 2002/0082901 A1 | 6/2002 | Dunning et al. | |
| 2003/0120630 A1 | 6/2003 | Tunkelang | |
| 2003/0120673 A1* | 6/2003 | Ashby et al. | 707/100 |
| 2003/0167173 A1* | 9/2003 | Levy et al. | 704/273 |
| 2003/0229537 A1 | 12/2003 | Dunning | |
| 2004/0003392 A1 | 1/2004 | Trajkovic | |
| 2004/0073924 A1 | 4/2004 | Pendakur | |
| 2004/0139064 A1 | 7/2004 | Chevallier | |
| 2004/0263337 A1 | 12/2004 | Terauchi et al. | |
| 2005/0058034 A1* | 3/2005 | Ando et al. | 369/47.27 |
| 2005/0060350 A1 | 3/2005 | Baum | |
| 2005/0102610 A1 | 5/2005 | Jie | |
| 2005/0193014 A1 | 9/2005 | Prince | |
| 2005/0198075 A1 | 9/2005 | Plastina et al. | |
| 2005/0203807 A1 | 9/2005 | Bezos et al. | |
| 2005/0210101 A1 | 9/2005 | Janik | |
| 2005/0216855 A1 | 9/2005 | Kopra | |
| 2005/0235811 A1 | 10/2005 | Dukane | |
| 2005/0276570 A1 | 12/2005 | Reed | |
| 2006/0015571 A1 | 1/2006 | Fukuda | |
| 2006/0015904 A1 | 1/2006 | Marcu | |
| 2006/0018208 A1 | 1/2006 | Nathan | |
| 2006/0018209 A1 | 1/2006 | Drakoulis | |
| 2006/0020662 A1 | 1/2006 | Robinson | |
| 2006/0026263 A1 | 2/2006 | Raghavan | |
| 2006/0053077 A1 | 3/2006 | Mourad | |
| 2006/0062094 A1 | 3/2006 | Nathan | |
| 2006/0074750 A1 | 4/2006 | Clark | |
| 2006/0095516 A1 | 5/2006 | Wijeratne | |
| 2006/0100978 A1 | 5/2006 | Heller | |
| 2006/0112098 A1 | 5/2006 | Renshaw | |
| 2006/0173910 A1 | 8/2006 | McLaughlin | |
| 2006/0173916 A1 | 8/2006 | Verbeck | |
| 2006/0195438 A1* | 8/2006 | Galuten | 707/4 |
| 2006/0195462 A1 | 8/2006 | Rogers | |
| 2006/0195789 A1* | 8/2006 | Rogers et al. | 715/727 |
| 2006/0206811 A1 | 9/2006 | Dowdy | |
| 2006/0253874 A1 | 11/2006 | Stark | |
| 2006/0259889 A1 | 11/2006 | Crosetto | |
| 2006/0288044 A1 | 12/2006 | Kashiwagi | |
| 2007/0043829 A1 | 2/2007 | Dua | |
| 2007/0061487 A1 | 3/2007 | Moore | |
| 2007/0203790 A1 | 8/2007 | Torrens | |
| 2007/0214133 A1 | 9/2007 | Liberty | |
| 2007/0250761 A1 | 10/2007 | Bradley | |
| 2007/0288310 A1 | 12/2007 | Boos | |
| 2007/0294096 A1 | 12/2007 | Randall | |
| 2008/0033897 A1 | 2/2008 | Lloyd | |
| 2008/0065471 A1 | 3/2008 | Reynolds | |
| 2008/0071136 A1 | 3/2008 | Oohashi | |

FOREIGN PATENT DOCUMENTS

| | | |
|---|---|---|
| EP | 1420388 | 5/2004 |
| JP | 11-052965 | 2/1999 |
| JP | 2002-108351 | 4/2002 |
| JP | 2003-255958 | 9/2003 |
| KR | 2002-025579 | 4/2002 |
| WO | WO2004070538 | 8/2004 |
| WO | WO2006052837 | 5/2006 |
| WO | WO2007134193 | 5/2007 |
| WO | WO2007075622 | 7/2007 |
| WO | WO2007092053 | 8/2007 |

OTHER PUBLICATIONS

N.A. Lazar; Bayesian Empirical Likelihood; Technical Report, Carnegi Mellon University, Department of Statistics, 2000; 26 pages.

S. Baluja, R. Seth, D. Sivakunnar, Y. Jing, J. Yagnik, S. Kumar, D. Ravichandran, and M. Aly, "Video Suggestion and Discovery for YouTube: Taking Random Walks Through the View Graph". In WWW '08: Proceedings of the 17th international conference on World Wide Web, pp. 895-904, Beijing, China, 2008. ACM Press.

A. Das, M. Dater, A. Garg, and S. Rajaram. "Google News Personalization: Scalable Online Collaborative Filtering". In WWW '07: Proceedings of the 16th international conference on World Wide Web, pp. 271-280, New York, NY, USA, 2007. ACM Press.

J. Dean and S. Ghemawat, "MapReduce: Simplied Data Processing on Large Clusters". Commun. ACM, 51 (1):107-113, 2008.

Y. Dempster, N. Laird, and D. Rubin. "Maximum Likelihood from Incomplete Data via the EM Algorithm". Jour. of the Royal Stat. Soc., Ser. B., 39:1047-1053, 1977.

T. Hofmann. "Unsupervised Learning by Probabilistic Latent Semantic Analysis". Mach. Learn., 42:177-196, 2001.

T. Hofmann. "Latent Semantic Models for Collaborative Filtering". ACM Transactions on Information Systems, 22:89-115, 2004.

P. Indyk and J. Matousek. "Low-Distortion Embeddings of Finite Metric Spaces". In Handbook of Discrete and Computational Geometry, pp. 177-196. CRC Press, 2004.

I. Scihira. "A Characterization of Singular Graphs". Electronic Journal of Linear Algebra, 16:451-462, 2007.

PCT/US2006/034218; International Search Authority; PCT International Search Report; Feb. 9, 2007; 3 pages.

PCT/US06/48330; International Bureau; PCT Search Report and Written Opinion; Mar. 20, 2008; 10 pages.

PCT/US2006/003795; International Search Report and Written Opinion of International Application; May 28, 2008.

Alvear, Jose, "Risk-Free Trial Streaming Media Delivery Tools," Streaming Media.com; www.streamingnnedia.com/article.ap?id=5768, Jun. 30, 2000.

Deshpande, Mukund, et al., "Item-Based Top-N Recommendation Algoriths," ACM Transactions on Information Systems, 22:1 (Jan. 2004), pp. 143-177.

Pachet, Francois, A Taxonomy of Musical Genres, Content-Based Multimedia Information Access Conference (RIAO), Paris, Apr. 2000, 8 pages.

Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, pp. 1-9.

Platt, John S., "Fasting Embedding of Sparse Music Similarity Graphs," Microsoft Corporation, {jplatt@microsoft.com}.

Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2F08s12.asp.

www.akoo.com/Akoo/, Web Page, Akoo, Pick the Music, Waiting in the line at the Theme Park, Introducing the m-Venue™ platform.

www.axcessnews.com/modules/wfsection/article.php?articleid=8327, Web Page, Feb. 24, 2006, Maintenance Fees, Digital Music Sales Triple to $1.1 Billion in 2005.

www.bmi.com/news/200403/20040324b.asp, Web Page, BMI™ Figures Don't Lie, Mar. 24, 2004, Touch Tunes Signs License Agreement for BMI Music in Digital Jukeboxes.
www.ecastinc.com/music_licensing.html, Web Page, Ecast Network, interactive entertainment network, Music/Licensing.
www.rfidjournal.com/article/articleview/1619/1/1, Web Page, RFID brings messages to Seattle side walks on RFID system being deployed next week will send marketing and assistive information to users carrying active RFID tags. RFID Journal (pp. 1-4).
www.roweinternational.com/jukeboxes_dia.html, Web Page, Digital Internet Access Jukeboxes, Rowe International.
www.touchtunes.com, Web Page, Touchtunes, Turn your Rowe 100A's and 100B's into touch tunes Digital Jukeboxes—BOSE.
www.alwayson-network.com/comments.php?id=P12663 0 37 0 C, Web Page, Not Your Average Jukebox, on Hollywood 1000 contender Ecast uses broadbank to being the digital media experience to your watering hole.
"New Music Recommendation System is Based on FOAF Personal Profiling," www.masternewmedia.org/music_recommendation/music_recommendation_system_FOAF, Oct. 1, 2005.
"Social Networking Meets Music Listening: Mecora Launches Radio 2.0," www.masternewmedia.org/news/2006/04/13/social_networking_meets_music_listening.htm, Apr. 13, 2006.
International Search Authority/US; PCT Search Report; Date Mar. 25, 2008; 3 Pages.
Cano, Pedro et al., On the Use of FastMap for Audio Retrieval and Browsing, The International Conferences on Music Information Retrieval and Related Activities (ISMIR 2002), Paris, France, Oct. 2002, 2 pages.
Connell, Iain et al., Ontological Sketch Models: Highlighting User-System Misfits, in P. Palanque, E. O'Neill and P. Johnson, editors, Proceedings of Human Computer Interaction (HCI), Bath, England, Sep. 2003, London Springer, pp. 1-16.
The Trustees of Indiana University, Variations2, The Indiana University Digital Music Library, http://dml.indiana.edu/, last updated May 11, 2005, 1 page.
Logan, Beth, Content-Based Playlist Generation: Exploratory Experiments, The International Conferences on Music Information Retrieval and Related Activities (ISMIR 2002), Paris, France, Oct. 2002, 2 pages.
Logan, Beth et al., A Music Similarity Function Based on Signal Analysis, IEEE International Conference on Multimedia and Expo (ICME), Tokyo, Japan, Aug. 2001, IEEE Press, pp. 952-955.
Maidin, Donncha Ó etal., The Best of Two Wolds: Retrieving and Browsing, Proceedings of the COST G-6 Conference on Digital Audio Effects (DAFX-00), Verona, Italy, Dec. 7-9, 2000, 4 pages.
Notess, Mark et al., Variations2; Toward Visual Interfaces or Digital MusicLibraries, Second International Workshop on Visual Interfaces to Digital Libraries, 2002, 6 pages.

Pampalk, Elias et al., Content-based Organization and Visualization of Music Archives, ACM Multimedia, Juan les Pins, France, Dec. 2002, pp. 570-579.
Pauws, Steffen et al., PATS: Realization and User Evaluation of an Automatic Playlist Generator, The International Conferences on Music Information Retrieval and Related Activities (ISMIR 2002), Paris, France, Oct. 2002, 9 pages.
Rauber, Andreas et al., The SOM-enhanced JukeBox:Organization and Visualization of Music Collections Based on Perceptual Models, Journal of New Music Research, vol. 32, No. 2, 2003, pp. 193-210.
Shneiderman, Ben, Tree Visualization with Tree-Maps: 2-d Space-Filling Approach, ACM Transactions on Graphics, vol. 11, No. 1, Jan. 1992, pp. 92-99.
Treemap, University of Maryland, http://www.cs.umd.edu/hcil/treemap/, last updated Aug. 5, 2003, 4 pages.
Shneiderman, Ben, Treemaps for Space-Constrained Visualization of Hierarchies, http://www.cs.umd.edu/hcil/treemap-history/, last updated Apr. 28, 2006, 16 pages.
Tzanetakis, George, et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.
Augmenting the Social Space of an Academic Conference; McCarthy, et al. Information School, University of Washington and Department of Computer Science and Engineering, University of Minnesota; pp. 1-10; Nov. 6-10, 2004. Retrieved from the internet: <URL: http://interrelativity.com/joe/publications/ProactiveDisplays-CSCW2004.pdf> entire document.
Toward University Mobile Interaction for Shared Displays; Tim Paek, et al.; Microsoft Research, Redmond, WA; pp. 1-4; Nov. 6-10, 2004. Retrieved from the internet: <URL: http://research.microsoft.com/~timpaek/Papers/cscw2004.pdf> entire document.
Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and Royal Institute of Technology; pp. 1-69; Nov. 2005. Retrieved from the Internet: <URL: http://www.sics.se/~asa/Thesis/CoverPaper.pdf> entire document.
MobiLenin—Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005. Retrieved from the internet: <URL: http://www.mediateam.oulu.fi/publications/pdf/660.pdf> entire document.
Jacucci, et al., Integrated Project on Interaction and Presence in Urban Environments. Feb. 9, 2007. Retrieved from the internet: <URL: http://ipcity.eu/wp-content/uploads/2007/02/D7.1%20-%20Demonstrator%20of%20Large-Scale%20Events%20Application.pdf> see p. 20.

* cited by examiner

METHODS AND APPARATUS FOR VISUALIZING A MEDIA LIBRARY

RELATED APPLICATIONS

This application is a continuation of co-pending U.S. application Ser. No. 11/543,730 filed Oct. 4, 2006, which claims priority from U.S. Provisional Application No. 60/723,865 filed Oct. 4, 2005, both of which are hereby incorporated by reference as though fully set forth.

BACKGROUND

This application relates to methods and apparatus for providing a graphical representation of a music library.

Effectively organizing a music library not only allows a user to get a sense of music contained in the library, but also helps them select and play the music. However, the popularity of digital audio encoding together with music distribution channels through the Internet have allowed users to collect hundreds or even thousands of media items. This change in scale of accessible music from the traditional album to thousands of songs makes choosing what music to listen to at a particular moment a challenge.

Digital media players, such as iTunes 10 of FIG. 1 introduced by Apple Computer, Inc., Cupertino, Calif., USA, allow users to play and organize digital music and video files using textual lists. Each item of the list may be categorized by track title 12, track length 14, artist 16, album 18, year released 20, genre 22, and composer 24. Track lists can be ordered alphanumerically by categories such as title 12, artist 16, album 18, or genre 22 for example. Search bar 26 may be used to perform a keyword-based search by one or more category, such as artist 16, album 18, or track title 12. Tracks may also be filtered using a genre filter 28, artist filter 30, or album filter 32, or all three filters may be used at the same time. For example, the user can filter all tracks by (1) Jazz using genre filter 28, (2) Billie Holiday using artist filter 30, and (3) Lady in Satin using album filter 32. Results from the filters are displayed in a results window 34 and may be ordered alphanumerically by one or more category, such as artist 16, album 18, or track title 12.

Playlists are also known to help organize and manage music libraries. A playlist is a subset of a library that defines an ordered sequence of media items to be played and are usually created by adding media items to the playlist one-by-one. A smart playlist follows a set of logical filtering criteria, such as all jazz from 1970 that were played in the last six months. Playlists may be generated in iTunes 10 using two different methods: (1) adding media items manually in a one-by-one manner; and (2) defining filtering criteria, such as artist 16, album 18, or track title 12, to create smart playlist 36. The smart playlist may automatically update when new media items are added to the library.

Playlists are also known to be automatically generable. PATS: Realization and User Evaluation of an Automatic Playlist Generator of Pauws et. al. refers to a Personalized Automatic Track Selection (PATS) that creates a playlist using a dynamic clustering method. Songs are grouped based on a similarity measure that selectively weighs categorization values of songs, such as track title, year released, album, style, tempo, instruments used, place of recording, record company, or rhythmic foundation. The similarity measure is selective in the sense that one categorization value may be more important than another. When the user selects a song, the cluster in which the song is contained is presented as a playlist. An inductive learning algorithm is used to eliminate tracks from future playlists based upon user input.

In addition, analyzing media items based on signal processing techniques are known to allow the user to organize and visualize a music library. However, these methods analyze each media item using signal processing techniques without requiring categorization based on genre, artist, and year.

Furthermore, visualizing search results is known to help users browse for digitized music. Variations2: Toward Visual Interfaces for Digital Music Libraries of Notess et. al. refers to visualizing music bibliographic data to assist music students and faculty members browse and search for digitized music. By way of example, a student may search for works by creator and instrumentation used. The results of the search are displayed with a grid-based visualization that uses icon shape to represent media type, such as audio, score, or video, color to represent the performer, and position within the grid to indicate both work genre (x-axis) and composer/work (y-axis). Hovering over an object gives details on the performer, for example.

However, each one of these references suffers from one or more of the following disadvantages: (1) the user does not have an overall feel for how many media items are in the music library; (2) the user cannot intuitively see what portion of the library represents a rock genre versus an easy listening genre, for example; (3) the user cannot easily see desired attributes about each media item in relation to the library as a whole, such as which media items they listen to most often; (4) the user cannot easily visualize, manage, or organize playlists; and (5) the user cannot easily rediscover media items in their music library or know which portion of their music library needs expansion.

The present inventors have recognized a need for improved apparatus and methods for providing a graphical representation of a music library.

BRIEF DESCRIPTION OF THE DRAWINGS

Features, aspects, and advantages of the present invention are set forth in the following description, appended claims, and accompanying drawings wherein:

DETAILED DESCRIPTION OF PREFERRED EMBODIMENTS

Throughout the specification, reference to "one embodiment," "an embodiment," or "some embodiments" means that a particular described feature, structure, or characteristic is included in at least one embodiment. Thus appearances of the phrases "in one embodiment," "in an embodiment," or "in some embodiments" in various places throughout this specification do not necessarily refer to the same embodiment.

Furthermore, the described features, structures, and characteristics may be combined in any suitable manner in one or more embodiments. Skilled persons will appreciate that the invention can be practiced without one or more of the specific details, or with other methods, components, materials, etc. In some instances, well-known structures, materials, and operations are omitted or not described in detail to avoid obscuring aspects of the embodiments.

Figure 1:
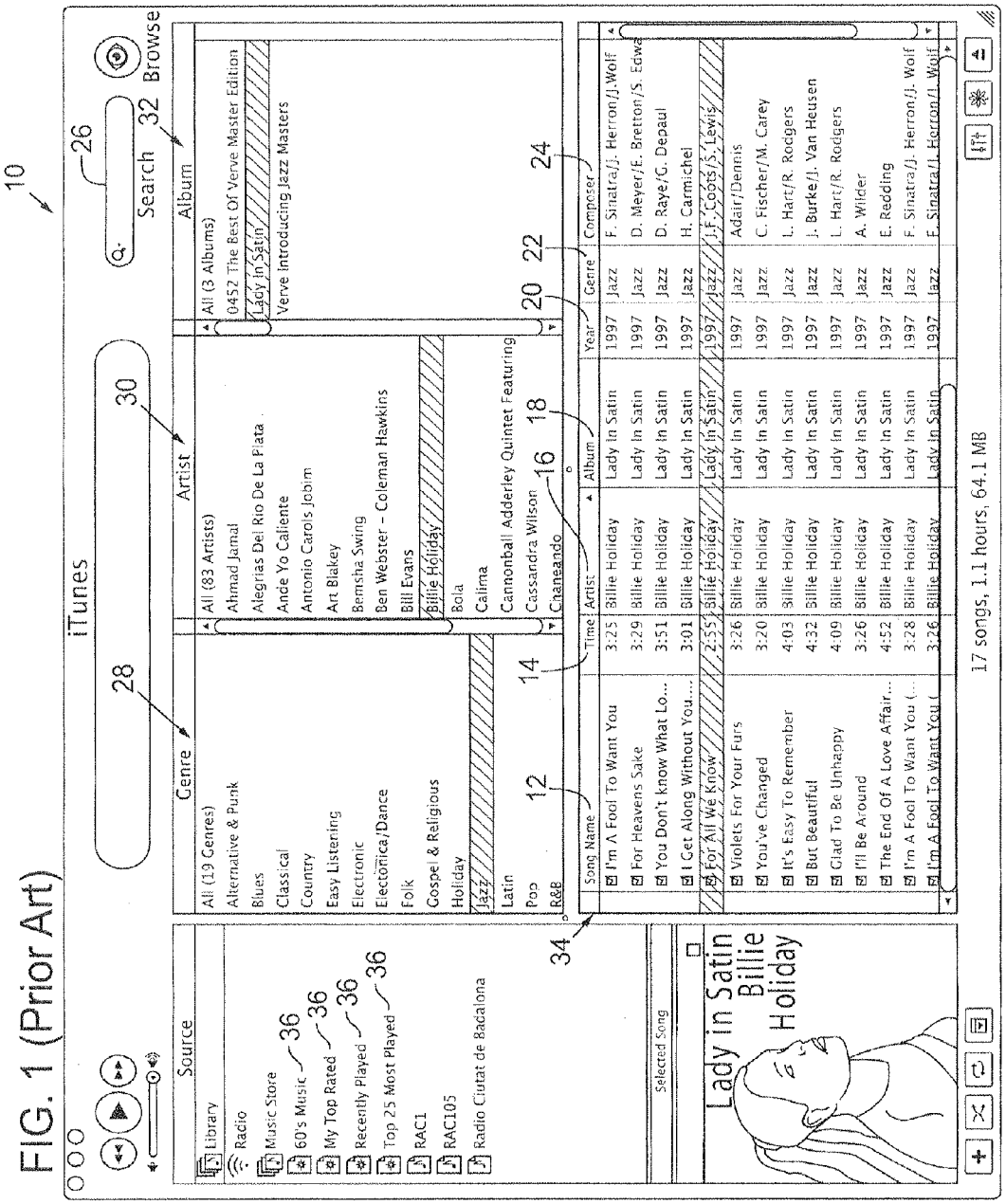
FIG. 1 shows a user interface for iTunes of the prior art.
Figure 2:
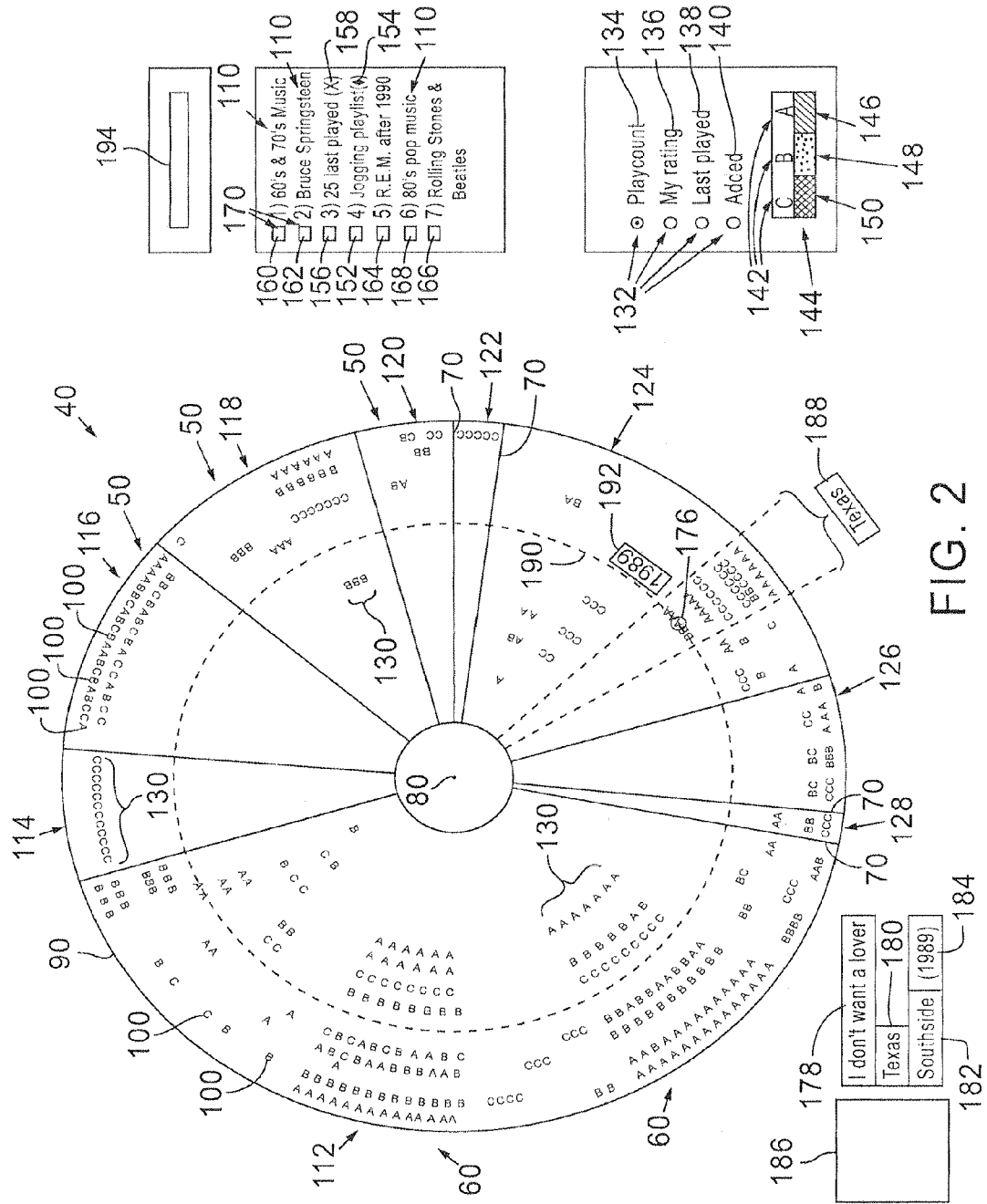
FIG. 2 shows a disk visualization of a music library according to a first embodiment.

FIG. 2 shows a disk visualization 40 of a music library according to a first embodiment. Disk visualization 40 includes a plurality of sectors 50 representing genre of the music library, one or more sub-sectors 60 representing artists associated with the genre, radii 70 representing a time axis, and a plurality of marks 100 corresponding to each media item of the music library. Disk visualization 40 may not only provide an overview of the total number of media items in the music library but may also provide good percentage and proportional overviews. In addition, disk visualization 40 may allow one or more playlists 110 to be visualized, managed and organized. Furthermore, disk visualization 40 may facilitate rediscovering media items in a music library instead of simply enlarging it. Therefore, when the time comes to expand the music library, disk visualization 40 may be helpful in deciding what to acquire or listen to next.

Referring now to FIG. 2, disk visualization 40 is divided into different sectors 50 that represent each genre of the library. For example, the music library illustrated in the embodiment of FIG. 2 is categorized into nine genres: (1) Rock genre 112; (2) Soundtrack genre 114; (3) Easy listening genre 116; (4) Electronica/dance genre 118; (5) Jazz genre 120; (6) Latin genre 122; (7) Pop genre 124; (8) Alternative and punk genre 126; and (9) R&B genre 128. The music library could also be classified into other genres, such as Classical music, Gospel, Blues, Rhythm and blues, Funk, Metal, Country music, Electronic music, Melodic music, Ska, Reggae, Dub, Hip hop, and Contemporary African music.

The size of each sector 50 may be proportional to the number of media items of the associated genre with respect to the whole library. Therefore, the size of each sector 50 may be directly proportional to the importance of the corresponding genre within the library. At the same time, sectors 50 may be split in sub-sectors 60 representing the artists of the associated genre. Again, the size of sub-sectors 60 may be proportional to the number of media items of the artist. The radii 70 of disk visualization 40, from the center 80 to the perimeter 90, could illustrate a time axis. In addition, the center 80 could represent the year of the oldest possible media item of the library and the perimeter 90 could represent the most recent media items in the library. While year may be described primarily in relation to a year an album was released, it is to be appreciated that year can include the year a media item was released, for example.

In addition, although media items may be described primarily in relation to songs or music tracks, it is to be appreciated that media items can include, but are not limited to, songs, tracks, music CDs, movies, music videos, documents, books, poems, and images (e.g., photographs), for example. Media items may be depicted as marks 100 and can be arranged within disk visualization 40 according to the media item's categorization. For example, the media items of the library may be categorized according to genre, artist, and year of release. Further categorizations may include title of the media item, album, style or era, tempo, musicians featured in the media item, instruments used in the media item, total number of musicians, soloing musicians, composer of the media item, producer of the media item, where the media item was recorded, whether the media item is a live performance, record company, rhythmic foundation, and melodic/harmonic development. In one embodiment, media items belonging to the same album are positioned contiguously thereby having the effect of producing arcs of points 130 representing albums. In addition, albums may be depicted in alphanumeric order and media items of the same album may be ordered in the original order of the album.

Quantitative attributes 132 may be chosen by the user. For example, quantitative attributes 132 may include playcount 134, rating 136, last played date 138, and added date 140. In addition, other quantitative attributes 132 may include ratings and reviews assigned by critics, artists, or others, or artists having new media items forthcoming. The quantitative attributes 132 may be depicted by marks 100 and colors may be used to express the exact value for one media item in its associated mark 100. For example, each mark 100 could have different color or grayscale tonalities indicative of quantitative attribute 132. By way of example, if the quantitative attribute 132 is playcount 134, a spectrum from light blue to black may be used. Marks 100 colored light blue could represent the most played media items, marks 100 colored black could represent the least played media items, and marks 100 colored according to another part of the spectrum could fall in between the most played and least played media items. In addition, each mark 100 could have a unique identification code 142, such as A, B, and C. By way of example, if the quantitative attribute 132 is playcount 134, A could represent the most played media item. C could represent the least played media item, and B could represent a media item falling in between the least played and most played.

Figure 3:
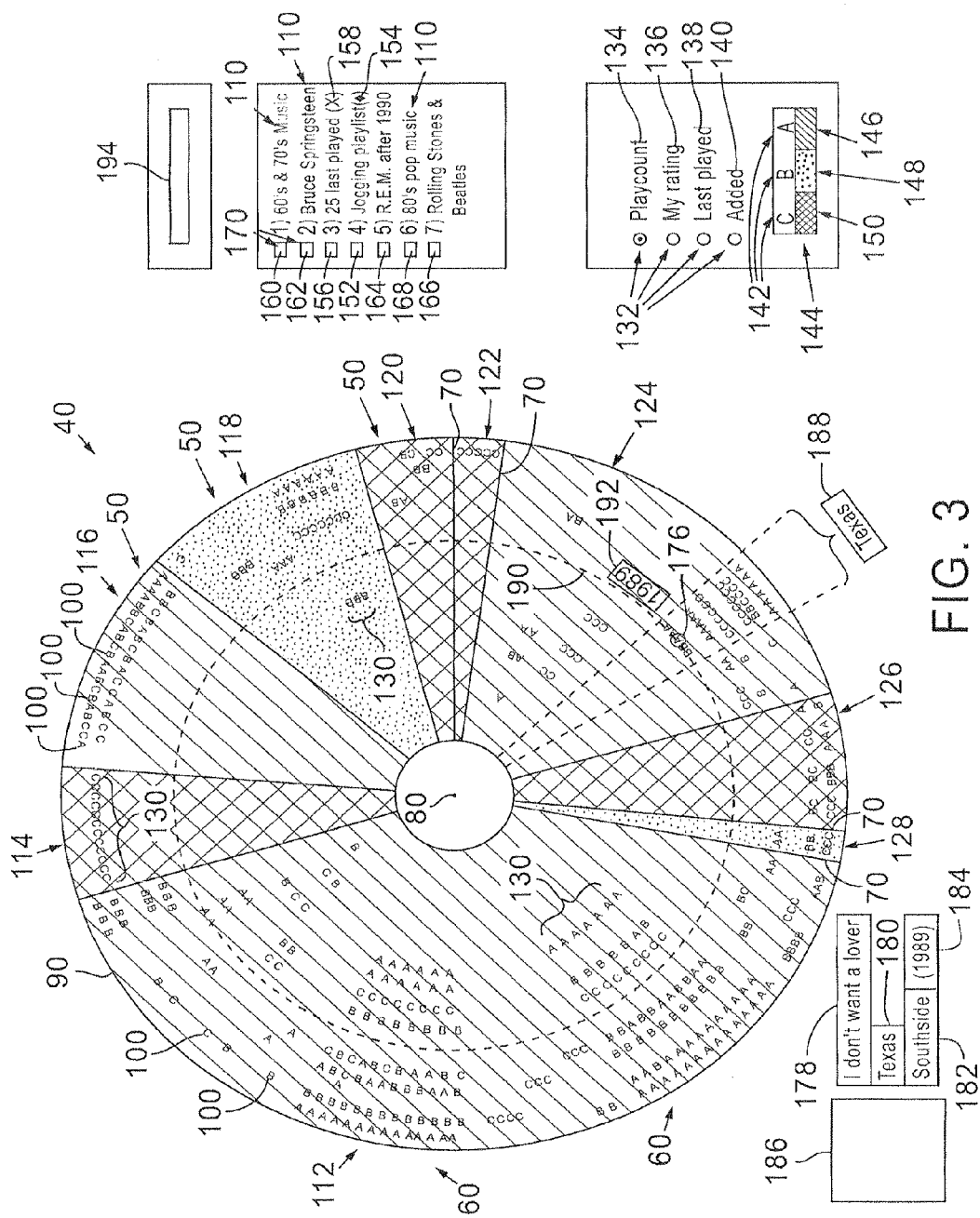
FIG. 3 shows the disk visualization of FIG. 2 with a mean value of a playcount of all media items within a sector illustrated.

Referring now to FIG. 3, a mean value of all the media items for one genre may be used to color a corresponding sector 50. For example, each sector 50 could have different color or grayscale tonalities indicative of the mean value of the playcount 134 of all media items within that sector 50. Again, a spectrum from light blue to black may be used, but other colors would be suitable. Sectors 50 colored light blue could represent sectors 50 having the most played media items, sectors 50 colored black could represent sectors 50 having the least played media items, and sectors 50 colored according to another part of the spectrum could represent sectors 50 having media items with a playcount falling between the most played and least played. In addition, each sector 50 could also be shaded with unique patterns 144 as shown in FIG. 3. By way of example, sectors 50 represented by a first unique pattern 146 could represent sectors 50 having the most played media items. In a similar manner, sectors 50 represented by a second unique pattern 148 could represent sectors 50 having media items with a playcount falling between the most played and least played. Finally, sectors 50 represented by a third unique pattern 150 could represent sectors 50 having the least played media items.

Figure 4:
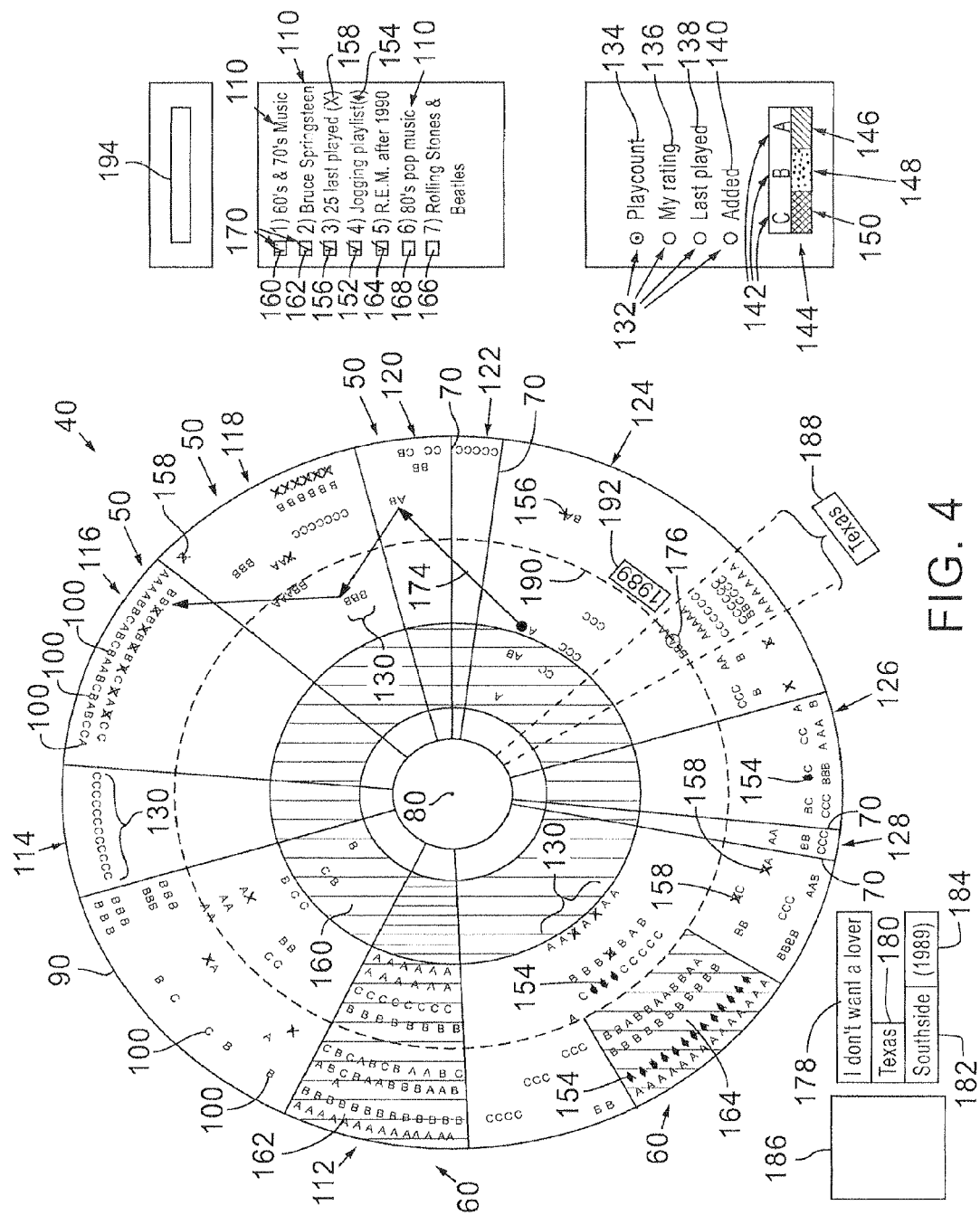
FIG. 4 shows the disk visualization of FIG. 2 having a graphical representation of playlists overlaid thereon.

Referring now to FIG. 4, playlists 110 are shown using the disk visualization 40. Playlists 110 may be created by adding media items in a one-by-one manner, or they could be smart playlists following a set of logical filtering criteria. Media items of playlists 110 without any grouping logic may be depicted using geometric forms different from marks 100, which are used in general for the rest of the media items. For example, jogging playlist 152 could be displayed using diamond shapes 154. While, diamond shapes 154 are colored black, other shapes, sizes, colors or shading could be used. Likewise, 25 last played playlist 156 could be represented using black crosses 158. Again, other shapes, sizes, colors or shading could also be used. Other playlists 110, including 60's and 70's music playlist 160, Bruce Springsteen playlist 162, and R.E.M. after 1990 playlist 164, may be shown as shaded regions since they follow a regular geometric form. In one embodiment, red shaded regions are used, but other colors, shading patterns, or indicia could also be used. Rolling Stones & Beatles playlist 166 and 80's pop music playlist 168 are not highlighted in the embodiment shown in FIG. 4 because the user has not activated the corresponding checkboxes 170.

Disk visualization 40 may also indicate currently playing media item 172. For example, currently playing media item 172 could be displayed using a circular shape. While, the circular shape illustrating currently playing media item 172 is colored black, other shapes, sizes, colors or shading could be used. Furthermore. Path 174 grouping media items to be played next could be displayed. In this manner, the user could get an idea of what regions of the library are going to be used in the current music sequence, such as playlist 110.

The user may interact with disk visualization 40 in a number of ways, including navigating media items, zooming over one or more sectors 50, managing playlists 110, and searching for media items. For example, additional information about any media item in the library may be visualized by positioning a cursor 176 over the mark 100 representing the media item. As illustrated in FIG. 2, cursor 176 is positioned over the media item/don't want a lover by Texas. Metadata, such as media item attributes, could be indicated in media item title field 178, artist name field 180, album name field 182, and year released field 184. In addition, an album cover field 186 may provide a visual indication of cover art associated with the album indicated in album name field 182.

If cursor 176 is positioned over one of sectors 50, the artist of corresponding sub-sector 60 may be highlighted. For example, as shown in FIG. 2, cursor 176 is over sector 50 representing the pop genre 124 and sub-sector 60 representing the group Texas. The name of the artist may be displayed in a sub-sector name field 188 as illustrated in FIG. 2. Likewise, the year of release may be highlighted with dashed-circle 190 and the actual year displayed in year field 192. In this manner, the user could see other media items released in the same year.

The user may also zoom over any sector 50 of the disk visualization 40 to get a more detailed view of the library. When the zoom feature is activated, a second disk visualization (not shown) could be generated with similar visualization and interaction principles but applied to the genre of selected sector 50. The second disk visualization may be displayed proximate disk visualization 40 or disk visualization 40 may simply be updated with new information. By way of example, if the user zooms over sector 50 representing pop genre 124, sectors 50 of disk visualization 40 representing genres may become sectors (not shown) representing artists. Likewise, sub-sectors 60 of disk visualization 40 representing artists may become sub-sectors (not shown) representing albums. All the other dimensions and general principles may remain the same.

The user may perform another level of zoom by selecting another sector of the second disk visualization. This could generate a third disk visualization (not shown) with similar visualization and interaction principles but applied to the artist of the selected sector. The third disk visualization may be displayed proximate the second disk visualization or the second disk visualization may simply be updated with new information. By way of example, if the user zooms over the sector representing the group Texas, sectors of the second disk visualization representing artists may become sectors (not shown) representing albums. In the third disk visualization, there may be no sub-sector, but the user could obtain a graphical representation of the media items for a given artist.

Referring again to FIG. 4, disk visualization 40 may not only be used to graphically display playlists 110, but may also be used to edit or create new playlists 110 using the graphical display. For example, playlists 110 may be considered as sets and new playlists 110 may be formed using set operations. By way of example, the user could select multiple playlists 110, such as the 60's and 70's music playlist 160 and the Bruce Springsteen playlist 162, and apply set operations, such as union, intersection, difference, or complements. The resulting playlists 110 could graphically displayed.

In addition, when creating or editing playlists 110 by directly selecting media items or by constructing a set of logic rules for smart playlists, the disk visualization 40 may be helpful by showing playlist 110 being created step-by-step. This may not only allow the user to immediately see the new playlist 110 take form, but it may also allow the user to see changes to the new playlist 110 in a real-time manner. Furthermore, the user can also approximate the size and topology of the new playlist 110 which provides a better idea of the zones of the library that are overused or underused, or the zones implied in each playlist 110.

Furthermore, the user may also search for media items using search bar 194. In response to the search, results may be dynamically filtered and highlighted on disk visualization 40.

Figure 5:
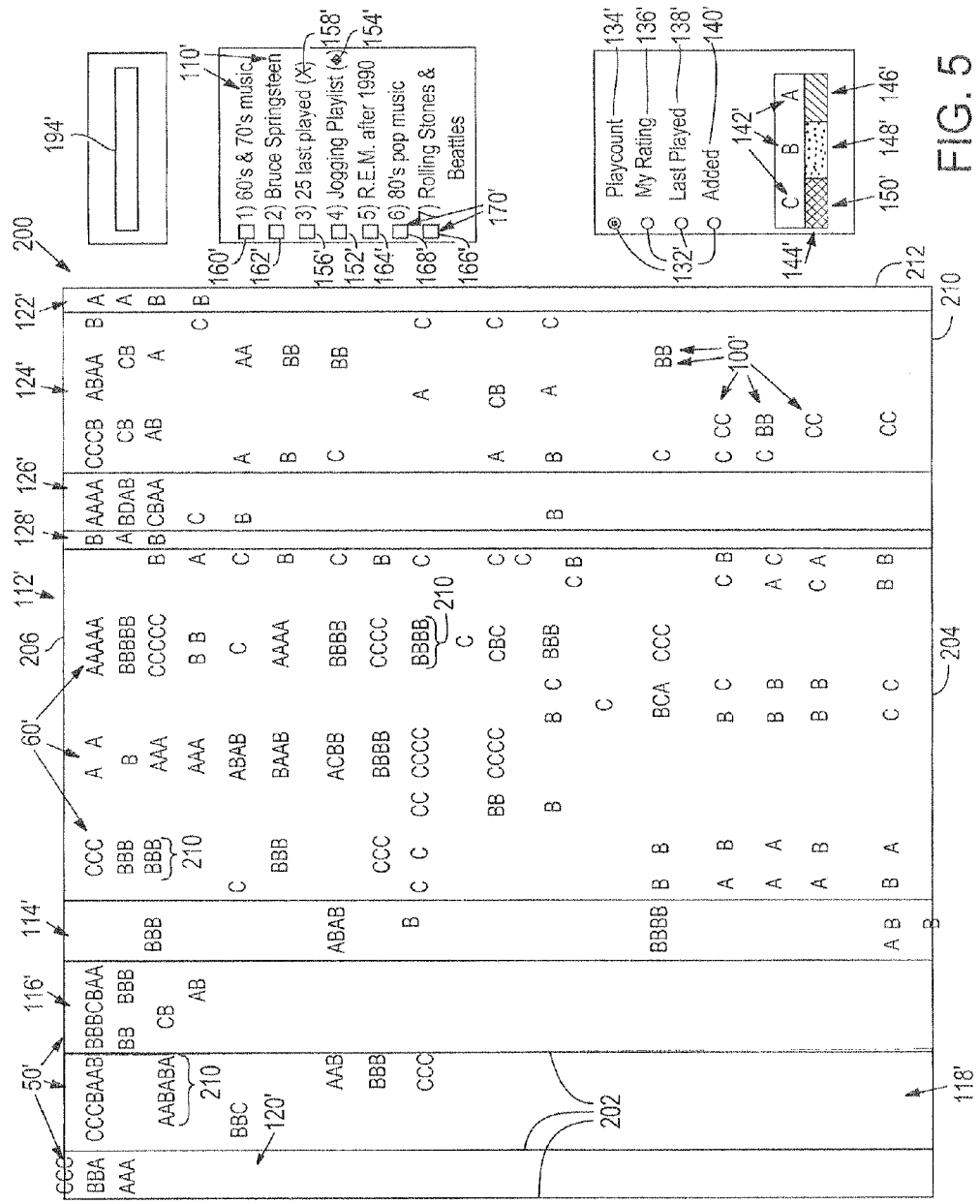
FIG. 5 shows a rectangular visualization of a music library according to a second embodiment.
Figure 6:
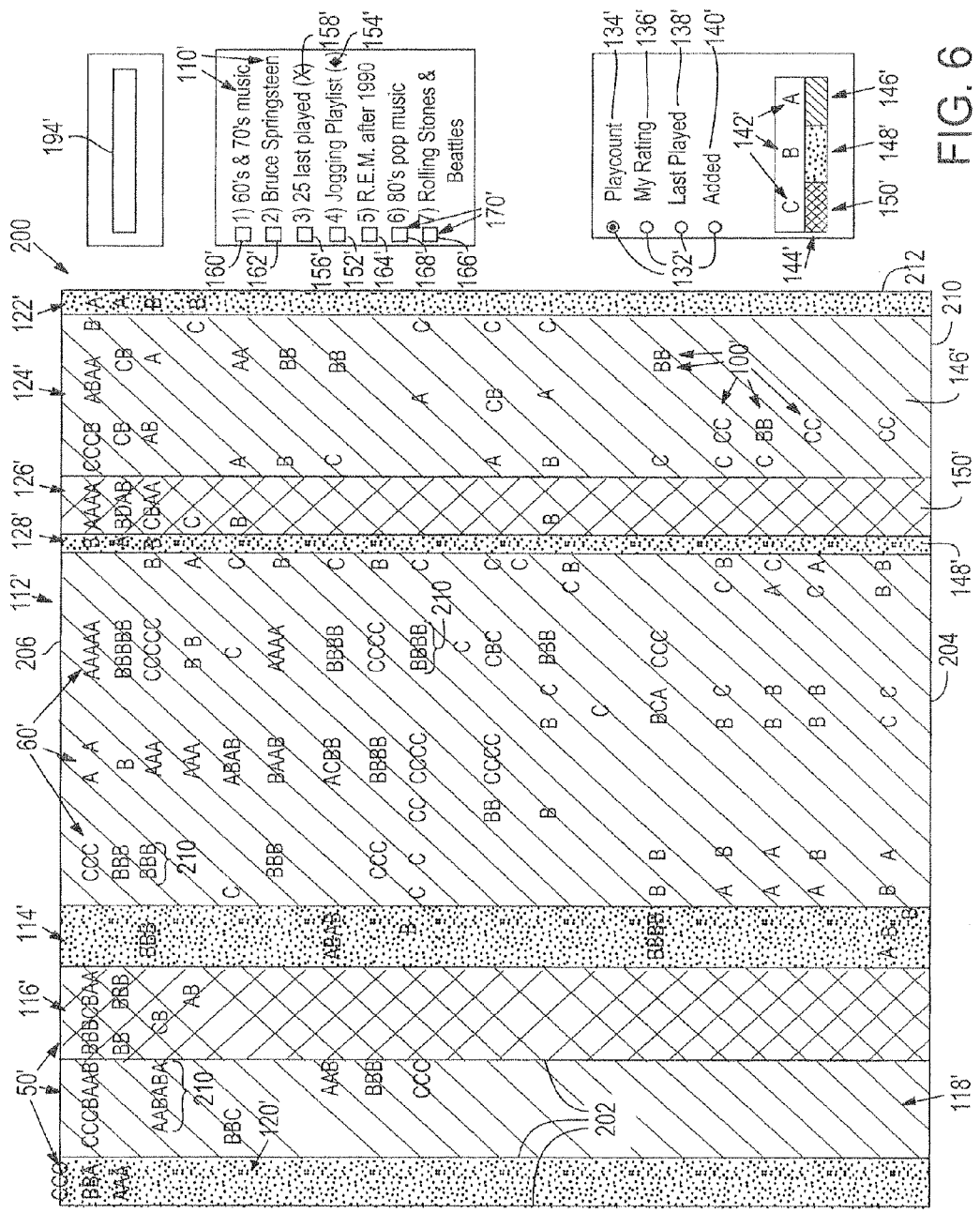
FIG. 6 shows the rectangular visualization of FIG. 5 with a mean value of a playcount of all media items within a sector illustrated.
Figure 7:
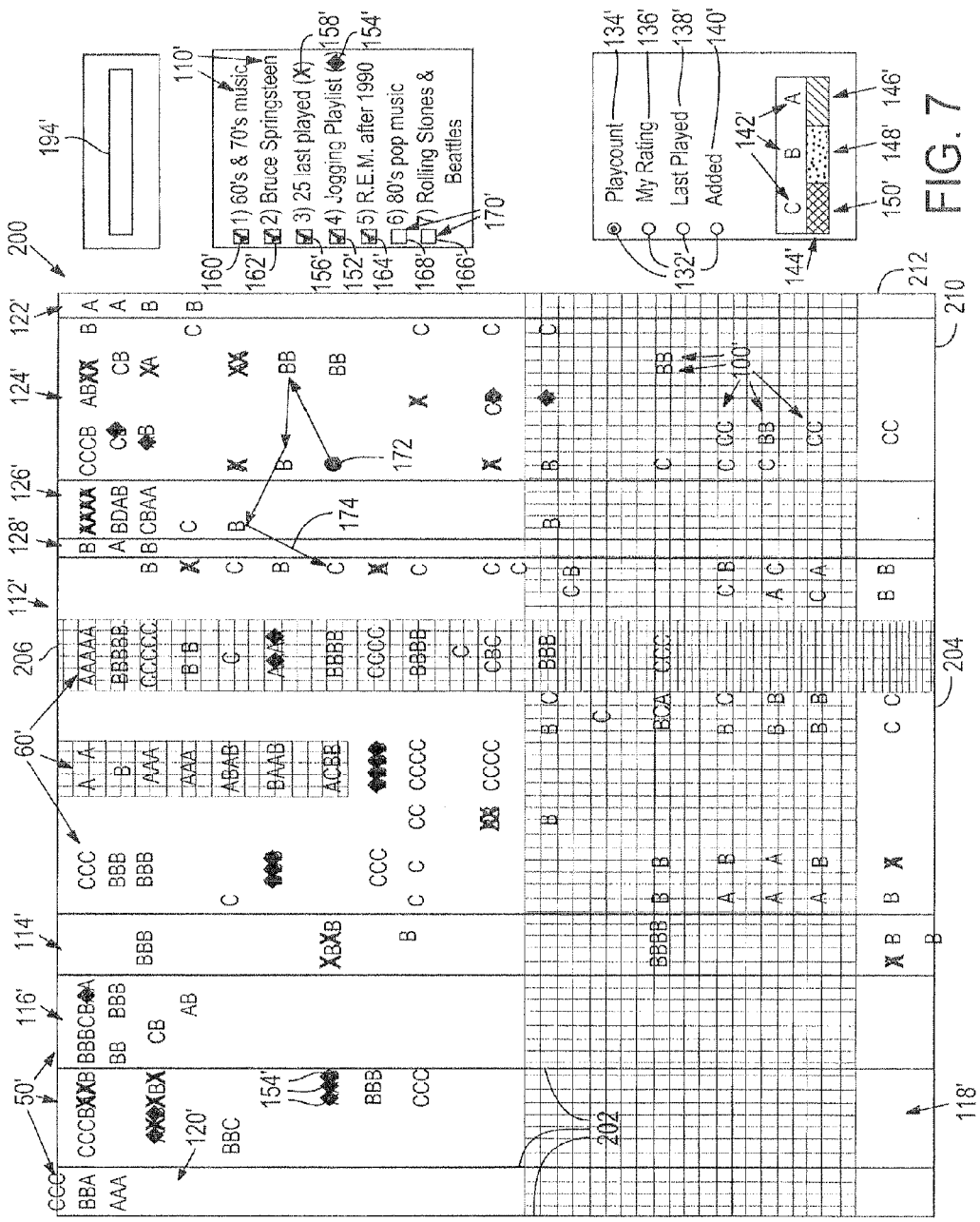
FIG. 7 shows the rectangular visualization of FIG. 5 having a graphical representation of playlists overlaid thereon.

FIGS. 5, 6, and 7 show a rectangular visualization 200 of a music library according to a second embodiment (in FIGS. 5, 6, and 7 reference numerals with the prime symbol, e.g., 50', indicate elements similar to those of the same name in the first embodiment, i.e., sectors 50). Rectangular visualization 200 includes a plurality of sectors 50' representing genre of the music library, one or more sub-sectors 60' representing artists associated with the genre, lines 202 representing a time axis, and a plurality of marks 100' corresponding to each media item of the music library.

Although a sector may be described as a plane figure bounded by two radii and the included arc of a circle, it is to be appreciated that sector may be described as a division into sectors, portions, or contiguous subparts, for example. Referring now to FIG. 5, rectangular visualization 200 is divided into different sectors 50' that represent each genre of the library. For example, the music library illustrated in the embodiment of FIG. 5 is categorized into nine genres: (1) Rock genre 112'; (2) Soundtrack genre 114'; (3) Easy listening genre 116'; (4) Electronica/dance genre 118'; (5) Jazz genre 120'; (6) Latin genre 122'; (7) Pop genre 124'; (8) Alternative and punk genre 126'; and (9) R&B genre 128'.

The size of each sector 50' may be proportional to the number of media items of the associated genre with respect to the whole library. Therefore, the size of each sector 50' may be directly proportional to the importance of the corresponding genre within the library. At the same time, sectors 50' may be split in sub-sectors 60' representing the artists of the associated genre. Again, the size of sub-sectors 60' may be proportional to the number of media items of the artist. Lines 202 of rectangular visualization 200 illustrate parallel lines of equal length defining sectors 50'. Bottom side 204 and top side 206 illustrate a time axis. For example, bottom side 204 could represent the year 1956 while top side 206 could represent the year 2004. In this manner, bottom side 204 may represent the year of the oldest possible media item of the library and top side 206 may represent the most recent media items in the library.

Media items may be depicted as marks 100' and are arranged within rectangular visualization 200 according to the media item's categorization. For example, the media items of the library may be categorized according to genre, artist, and year of release. Further categorizations may include title of the media item, album, style or era, tempo, musicians featured in the media item, instruments used in the media item, total number of musicians, soloing musicians, composer of the media item, producer of the media item, where the media item was recorded, whether the media item is a live performance, record company, rhythmic foundation, and melodic/harmonic development. In one embodiment, media items belonging to the same album are positioned contiguously thereby having the effect of producing a line of points 210 representing albums. In addition, albums may be depicted in alphanumeric order and media items of the same album may be ordered in the original order of the album.

Quantitative attributes 132' may be chosen by the user. For example, quantitative attributes 132' may include playcount 134', rating 136', last played date 138', and added date 140'. In addition, other quantitative attributes 132' may include ratings and reviews assigned by critics, artists, or others, or artists having new works forthcoming. The quantitative attributes 132' may be depicted by marks 100' and colors may be used to express the exact value for one media item in its associated mark 100'. For example, each mark 100' could have different color or grayscale tonalities indicative of quantitative attribute 132'. By way of example, if the quantitative attribute 132' is playcount 134', a spectrum from light blue to black may be used. Marks 100' colored light blue could represent the most played media items, marks 100' colored black could represent the least played media items, and marks 100' colored according to another part of the spectrum could fall in between the most played and least played media items. In addition, each mark 100' could have a unique identification code 142', such as A. B. and C. By way of example, if the quantitative attribute 132' is playcount 134'. A could represent the most played media item. C could represent the least played media item, and B could represent a media item falling in between the least played and most played.

Referring now to FIG. 6, a mean value of all the media items for one genre may be used to color a corresponding sector 50'. For example, each sector 50' could have different color or grayscale tonalities indicative of the mean value of the playcount 134' of all media items within that sector 50'. Again, a spectrum from light blue to black may be used, but other colors would be suitable. Sectors 50' colored light blue could represent sectors 50' having the most played media items, sectors 50' colored black could represent sectors 50' having the least played media items, and sectors 50' colored according to another part of the spectrum could represent sectors 50' having media items with a playcount falling between the most played and least played. In addition, each sector 50' could also be shaded with unique patterns 144' as shown in FIG. 6. By way of example, sectors 50' represented by a first unique pattern 146' could represent sectors 50' having the most played media items. Sectors 50' represented by a second unique pattern 148' could represent sectors 50' having media items with a playcount falling between the most played and least played. Finally, sectors 50' represented by a third unique pattern 150' could represent sectors 50' having the least played media items.

Referring now to FIG. 7, playlists 110' are shown using the rectangular visualization 200. Playlists 110' may be created by adding media items in a one-by-one manner, or they could be smart playlists following a set of logical filtering criteria. Media items of playlists 110' without any grouping logic may be depicted using geometric forms different from marks 100', which can be used in general for the rest of the media items. For example, jogging playlist 152' could be displayed using diamond shapes 154'. While, diamond shapes 154' are colored black, other shapes, sizes, colors or shading could be used. Likewise, 25 last played playlist 156' could be represented using black crosses 158'. Again, other shapes, sizes, colors or shading could also be used. Other playlists 110', including 60's and 70's music playlist 160', Bruce Springsteen playlist 162', and R.E.M. after 1990 playlist 164', may be shown as shaded regions since they follow a regular geometric form. In a preferred embodiment, red shaded regions are used, but other colors, shading patterns, or indicia could also be used. Rolling Stones & Beatles playlist 166' and 80's pop music playlist 168' are not highlighted because the user has not activated their corresponding checkboxes 170'.

Rectangular visualization 200 may also indicate currently playing media item 172'. For example, currently playing media item 172' could be displayed using a circular shape. While, the circular shape illustrating currently playing media item 172' is colored black, other shapes, sizes, colors or shading could be used. In addition, path 174' grouping media items to be played next could also be displayed. In this manner, the user might get an idea of what regions of the library are going to be used in the current music sequence, such as playlist 110'.

The user may interact with rectangular visualization 200 in a number of ways, including navigating media items, zooming over one or more sectors 50', managing playlists 110', and searching for media items. For example, additional information about any media item in the library may be visualized by positioning a cursor (not shown) over a mark 100' in a manner similar to that described for disk visualization 40. In addition, if the cursor is positioned over a sector 50', the artist of corresponding sub-sector 60' may be highlighted in a manner similar to that described for disk visualization 40, except that the year of release may be highlighted with a dashed-line (not shown).

The user may also zoom over any sector 50' in a manner similar to that described for disk visualization 40 to get a more detailed view of the library. For example, when the zoom feature is activated, a second rectangular visualization (not shown) may be generated with similar visualization and interaction principles but applied to the genre of selected sector 50'. The second rectangular visualization may be displayed proximate rectangular visualization 200 or rectangular visualization 200 may simply be updated with new information. By way of example, if the user zooms over sector 50' representing pop genre 124', sectors 50' of rectangular visualization 200 representing genres may become sectors (not shown) representing artists. Likewise, sub-sectors 60' of rectangular visualization 200 representing artists may become sub-sectors (not shown) representing albums. All the other dimensions and general principles could remain the same.

The user may perform another level of zoom by selecting another sector of the second rectangular visualization. This could generate a third rectangular visualization (not shown) with similar visualization and interaction principles but applied to the artist of the selected sector. The third rectangular visualization may be displayed proximate the second rectangular visualization or the second rectangular visualization may simply be updated with new information. By way of example, if the user zooms over the sector representing the group Bruce Springsteen, sectors of the second rectangular visualization representing artists may become sectors (not shown) representing albums. In the third rectangular visualization, there may be no sub-sector, but the user could obtain a graphical representation of the media items for a given artist.

Another way of applying a zoom function in the rectangle visualization 200 is to consider that the media items in the library are always shown, but the scale of a horizontal axis 210 or vertical axis 212 changes. For example, the user could explore the entire library by using a scroll bar (not shown) for panning over a specific zone. In this manner, when zooming in, the horizontal axis 210 still represents the genres, and the artists within each genre. Another level of zoom, as previously described, could be used in which the horizontal axis 210 also represents the albums for each artist. Accordingly, the horizontal axis 210 and its scroll bar may be adapted depending on the zoom level.

Referring again to FIG. 7, rectangular visualization 200 may be used to graphically display playlists 110' and to edit or create new playlists 110' using the graphical display in a manner similar to that described for disk visualization 40. In addition, the user may also search for media items using search bar 194'. In response to the search, results may be dynamically filtered and highlighted on rectangular visualization 200.

Figure 8A:
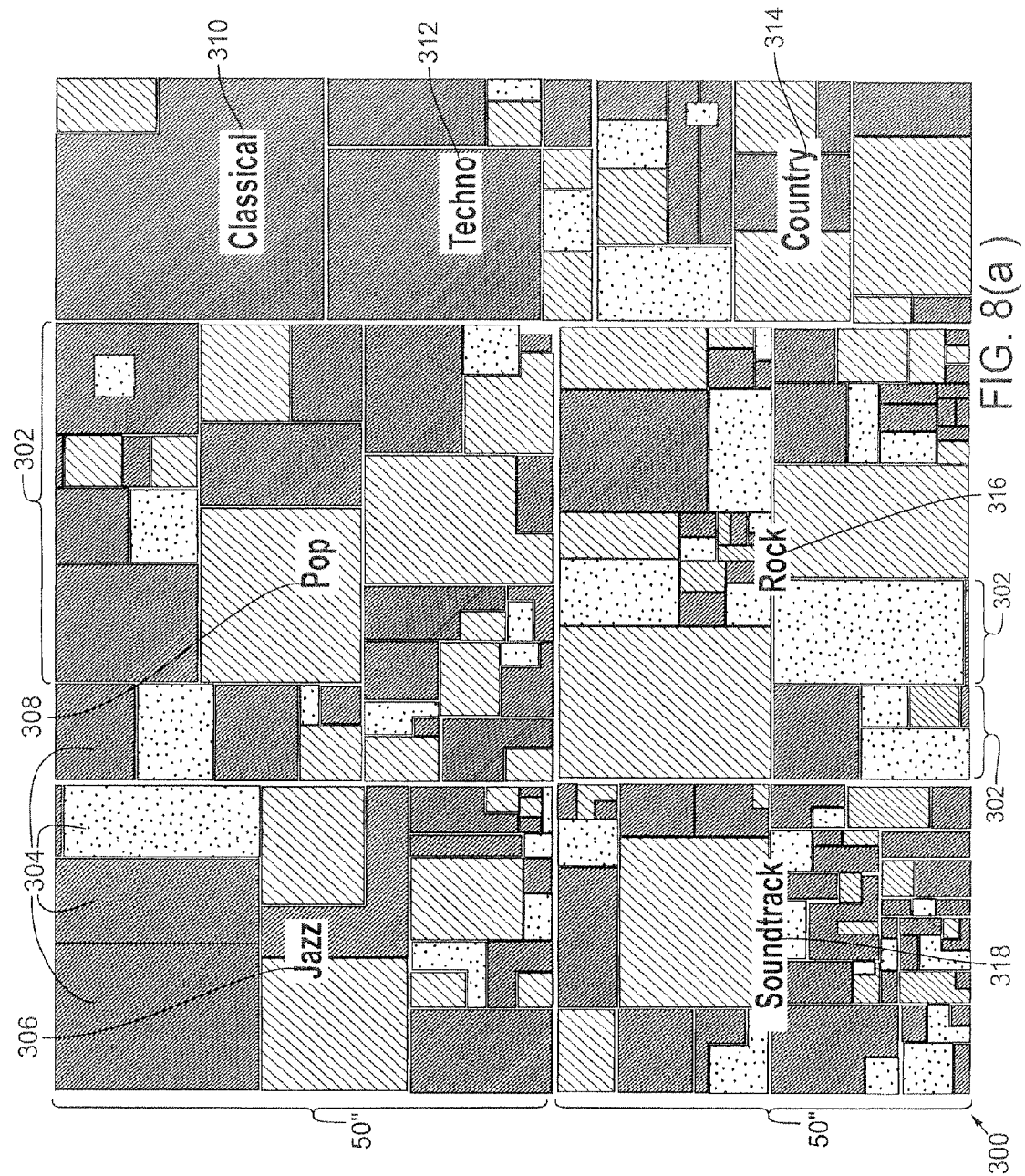
FIG. 8A shows a Tree-Map visualization of a music library according to a third embodiment.
Figure 8B:
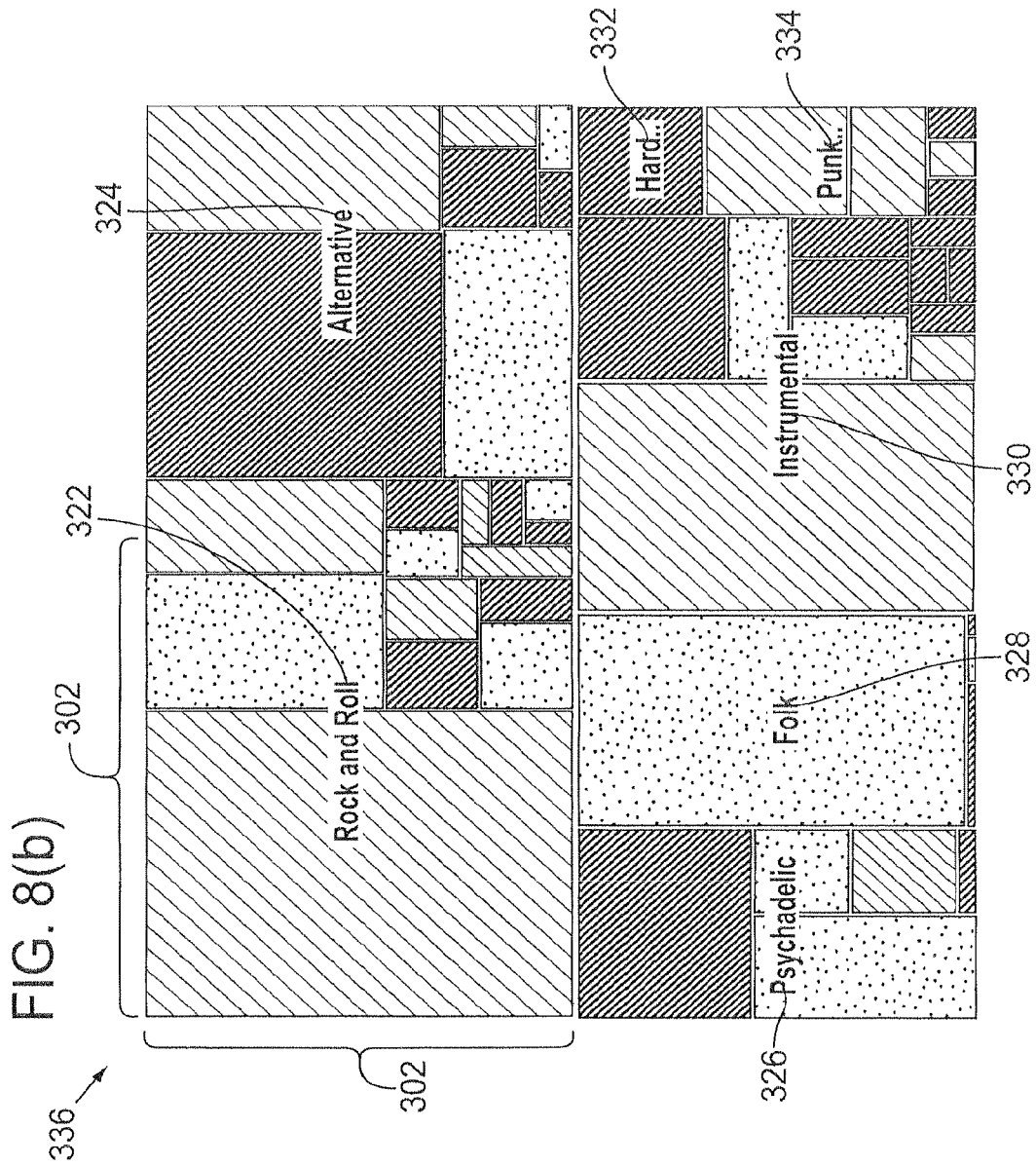
FIG. 8B shows a Tree-Map visualization for the rock genre of FIG. 8A.
Figure 8C:
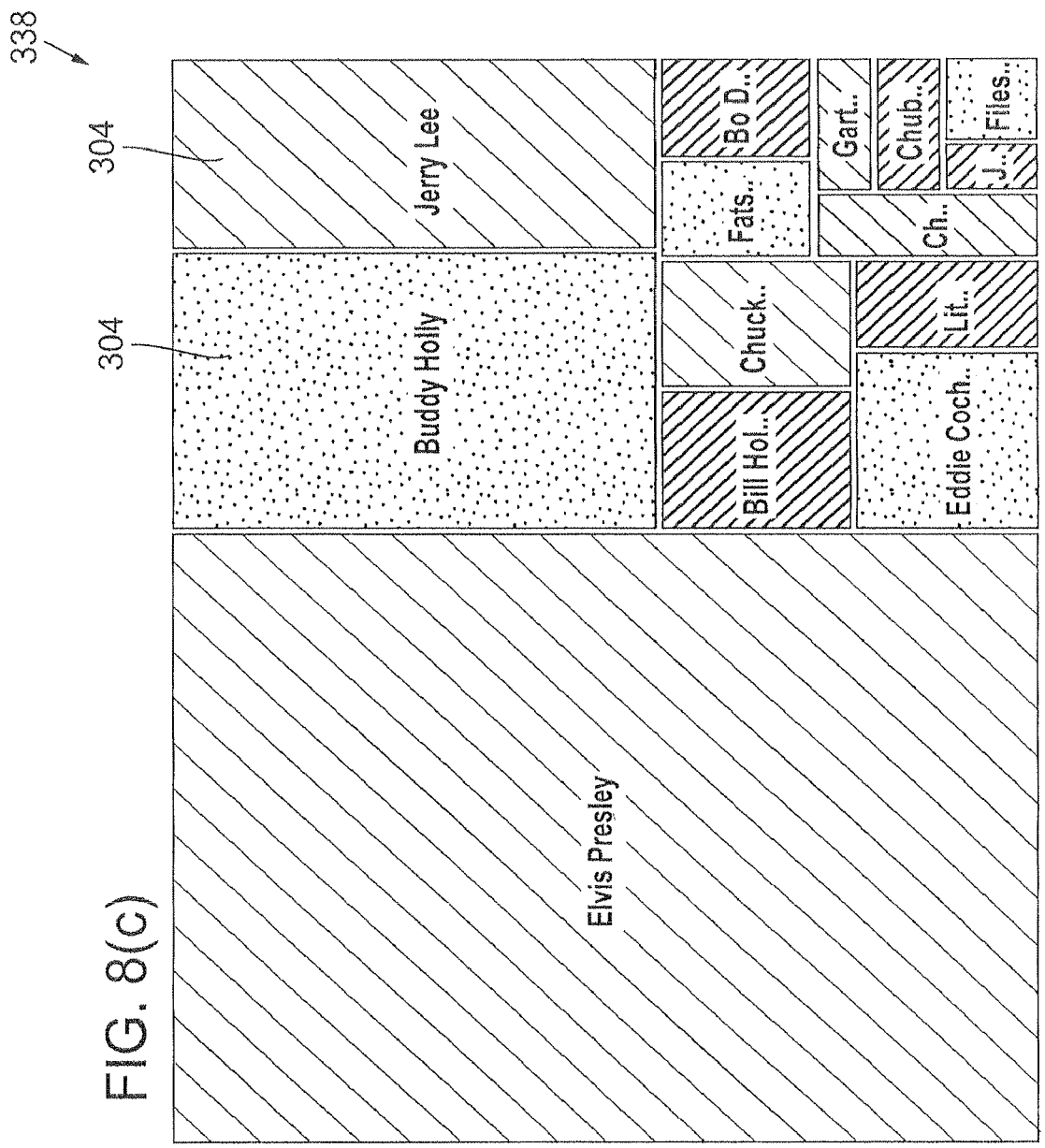
FIG. 8C shows a Tree-Map visualization for the rock and roll sub-genre of FIG. 8B.

FIGS. 8A, 8B, and 8C show a Tree-Map visualization 300 of a music library according to a third embodiment (in FIGS. 8A, 8B, and 8C reference numerals with the prime symbol, e.g., 50", indicate elements similar to those of the same name in the first embodiment, i.e., sectors 50). Tree-Map visualization 300 includes a plurality of sectors 50" representing genre of the music library, one or more first sub-sectors 302 representing sub-genres associated with the genre, one or more second sub-sectors 304 representing artists associated with each sub-genre, and an indicia representing a mean value of an attribute of all media items within a second sub-sector. Tree-Map visualization 300 may give the user a good overview of the number of media items belonging to each genre, sub-genre, and artist as represented by the respective rectangle sizes. However, in one embodiment. Tree-Map visualization 300 does not display information about individual media items or playlists.

Referring now to FIG. 8A, Tree-Map visualization 300 is divided into different sectors 50" that represent each genre of the library. For example, the music library illustrated in the embodiment of FIG. 8A is categorized into seven genres: (1) Jazz genre 306; (2) Pop genre 308; (3) Classical genre 310; (4) Techno genre 312; (5) Country genre 314; (6) Rock genre 316; and (7) Soundtrack genre 318.

The size of each sector 50" may be proportional to the number of media items of the associated genre with respect to the whole library. At the same time, sectors 50" may be split into one or more first sub-sectors 302 representing sub-genres associated with the sector 50". For example, sub-genres of Rock genre 316 may include Rock and roll sub-genre 322, Alternative sub-genre 324, Psychedelic sub-genre 326, Folk sub-genre 328, Instrumental sub-genre 330, Hard rock sub-genre 332, and Punk sub-genre 334. Of course, other sub-genre may be available for other genre. Each first sub-sector may be sized to reflect a ratio between the number of media items associated with the first sub-sector 302 and all the media items in the sector 50". In addition, each first sub-sector 302 may be divided into one or more second sub-sectors 304 representing artists associated with the first sub-sector 302. Each second sub-sector 304 may be sized to reflect a ratio between the number of media items associated with the second sub-sector 304 and all the media items in the first sub-sector 302. Further, each second sub-sector 304 may be divided into one or more third sub-sectors 320 representing albums associated with the second sub-sector 304. Each third sub-sector 320 may be sized to reflect a ratio between the number of media items associated with the third sub-sector 320 and all the media items in the second sub-sector 304.

In a manner similar to that for disk visualization 40 and rectangular visualization 200, quantitative attributes may be chosen by the user. For example, quantitative attributes may include playcount, rating, last played date, and added date. In addition, other quantitative attributes may include ratings and reviews assigned by critics, artists, or others, or artists having new works forthcoming. The mean value of all the media items in each second sub-sector 304 may be used to color a corresponding second sub-sector 304. For example, each second sub-sector 304 could have different color or grayscale tonalities indicative of the mean value of the playcount of all media items within that second sub-sector 304. A spectrum from light blue to black may be used, but other colors would be suitable.

Second sub-sectors 304 colored light blue could represent second sub-sector 304 having the most played media items, second sub-sectors 304 colored black could represent second sub-sectors 304 having the least played media items, and second sub-sectors 304 colored according to another part of the spectrum could represent second sub-sectors 304 having media items with a playcount falling between the most played and least played. In addition, each second sub-sector 304 could also be shaded with unique patterns as discussed with reference to FIGS. 3 and 6, Furthermore, the mean value of all the media items in each third sub-sector 320 may be used to color a corresponding third sub-sector 320.

The user may also zoom over any sector 50" in a manner similar to that described for disk visualization 40 and rectangular visualization 200 to get a more detailed view of the library. For example, when the zoom feature is activated, a Second Tree-Map visualization 336 may generated with similar visualization and interaction principles but applied to the genre of selected sector 50". The second Tree-Map visualization 336 may be displayed proximate Tree-Map visualization 300 or Tree-Map visualization 300 may simply be updated with new information. By way of example, if the user zooms over sector 50" representing Rock genre 316, sectors 50" of Tree-Map visualization 300 representing genres may become sectors (not shown) representing sub-genres including Rock and roll sub-genre 322, Alternative sub-genre 324, Psychedelic sub-genre 326, Folk sub-genre 328, Instrumental sub-genre 330, Hard rock sub-genre 332, and Punk sub-genre 334. Likewise, first sub-sectors 302 of Tree-Map visualization 300 representing sub-genre may become additional sub-sectors (not shown) representing artists. All the other dimensions and general principles could remain the same.

The user may perform another level of zoom by selecting any second sector of the second Tree-Map visualization 336 corresponding to a sub-genre. This could generate a third Tree-Map visualization 338 with similar visualization and interaction principles but applied to the sub-genre of the selected second sector. The third Tree-Map visualization 338 may be displayed proximate the second Tree-Map visualization 336 or the second Tree-Map visualization 336 may simply be updated with new information. By way of example, if the user zooms over the second sector representing the Rock and roll sub-genre 322, sectors of the second Tree-Map visualization representing sub-genre may become sectors (not shown) representing artists.

It will be obvious to those having skill in the art that many changes may be made to the details of the above-described embodiments without departing from the underlying principles of the invention. The scope of the present invention should, therefore, be determined only by the following claims.

The invention claimed is:

1. A computer-implemented method for generating a graphical representation of a media library comprising:
   accessing a datastore of metadata that describes a set of media items, the metadata including at least first, second and third attribute values for each media item;
   generating a visualization screen display wherein the screen display comprises a geometric shape, the geometric shape divided into a plurality of sectors, each sector representing a corresponding value of the first attribute, and each sector sized to reflect a ratio computed as the number of media items in the media library that have the first attribute value associated with the sector, divided by the total number of media items in the media library,
   and further wherein each sector is divided into one or more sub-sectors, each sub-sector representing a corresponding value of the second attribute, and each sub-sector sized to reflect a ratio computed as the number of media items in the media library that have the second attribute value associated with the sub-sector, divided by the total number of media items in the sector;
   in the screen display, displaying a mark for each one of the set of media items, wherein the displaying step includes;
   locating each mark within a selected sub-sector that is associated with the first and second attribute values for the corresponding media item; and
   positioning each mark within the selected sub-sector spaced apart from a selected point within the geometric shape by a selected distance responsive to the third attribute value of the corresponding media item.

2. A computer-implemented method according to claim 1 wherein:
   the geometric shape of the visualization screen display is a circle; and
   each sector of the display is a geometric sector of the circle.

3. A computer-implemented method according to claim 2 wherein:
   the selected point in the geometric shape is the center of the circle, so that the third attribute value of a media item is represented graphically as a distance from the center of the circle.

4. A computer-implemented method according to claim 3 wherein:
   the first attribute value for each media item in the datastore is one of a binary value, a numeric value, an n-tuple, wherein n is an integer, and a text string;
   the second attribute value for each media item in the datastore is one of a binary value, a numeric value, an n-tuple, wherein n is an integer, and a text string; and
   the third attribute value for each media item in the datastore is a numeric value or a date.

5. A computer-implemented method according to claim 3 wherein:
   said positioning each mark spaced apart from the center of the circle includes positioning the mark along a radius of the circle, and locating the mark along the radius by a distance responsive to comparing the third attribute value of the mark to a range of the third attribute values of all the marks in the media item dataset.

6. A computer-implemented method according to claim 5 wherein:
   the media items are music items;
   one of the first and second attributes of a music item is a genre;
   the other one of the first and second attributes of a music item is an artist; and
   the third attribute of a music item is a date or year of release of the item.

7. A computer-implemented method according to claim 5 wherein: the media items in the library comprise any of songs, tracks, music CDs, movies, music videos, documents, books, poems, and photographs.

8. A computer-implemented method according to claim 5 wherein:
   the attributes of the media items, stored as metadata in the datastore, include one or more of title of the media item, album, style or era, tempo, musicians featured in the media item, instruments used in the media item, total number of musicians, soloing musicians, composer of the media item, producer of the media item, where the media item was recorded, whether the media item is a live performance, record company, rhythmic foundation, and melodic/harmonic development.

9. A computer-implemented method according to claim 5 wherein:
   the attributes of the media items, stored as metadata in the datastore, include one or more of playcount, rating, last played date, and added date.

10. A non-transitory computer-readable medium storing a computer program having instructions to perform the following steps:
    accessing a datastore of metadata that describes a set of media items, the metadata including at least first, second and third attribute values for each media item;
    generating a visualization screen display wherein the screen display comprises a geometric shape, the geometric shape divided into a plurality of sectors, each sector representing a corresponding value of the first attribute, and each sector sized to reflect a ratio computed as the number of media items in the media library that have the first attribute value associated with the sector, divided by the total number of media items in the media library,
    and further wherein each sector is divided into one or more sub-sectors, each sub-sector representing a corresponding value of the second attribute, and each sub-sector sized to reflect a ratio computed as the number of media items in the media library that have the second attribute value associated with the sub-sector, divided by the total number of media items in the sector;
    in the screen display, displaying a mark for each one of the set of media items, wherein the displaying step includes;
    locating each mark within a selected sub-sector that is associated with the first and second attribute values for the corresponding media item; and
    positioning each mark within the selected sub-sector spaced apart from a selected point within the geometric shape by a selected distance responsive to the third attribute value of the corresponding media item.

11. A non-transitory computer-readable medium according to claim 10 wherein:
    the geometric shape of the visualization screen display is a circle; and
    each sector of the display is a geometric sector of the circle.

12. A non-transitory computer-readable medium according to claim 11 wherein:

the selected point in the geometric shape is the center of the circle, so that the third attribute value of a media item is represented graphically as a distance from the center of the circle.

13. A non-transitory computer-readable medium according to claim 10 wherein:
the first attribute value for each media item in the datastore is one of a binary value, a numeric value, an n-tuple, wherein n is an integer, and a text string;
the second attribute value for each media item in the datastore is one of a binary value, a numeric value, an n-tuple, wherein n is an integer, and a text string; and
the third attribute value for each media item in the datastore is a numeric value or a date.

14. A non-transitory computer-readable medium according to claim 11 wherein:
said positioning each mark spaced apart from the center of the circle includes positioning the mark along a radius of the circle, and locating the mark along the radius by a distance responsive to comparing the third attribute value of the mark to a range of the third attribute values of all the marks in the media item dataset.

* * * * *